United States Patent
Iimura et al.

(10) Patent No.: US 7,136,269 B2
(45) Date of Patent: Nov. 14, 2006

(54) INVERTED CIRCUIT OVERCURRENT PROTECTION DEVICE AND HYBRID INTEGRATED CIRCUIT DEVICE WITH THE SAME INCORPORATED

(75) Inventors: Junichi Iimura, Gunma (JP); Katsumi Okawa, Gunma (JP); Yasuhiro Koike, Gunma (JP); Soichi Izutani, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 658 days.

(21) Appl. No.: 10/422,556

(22) Filed: Apr. 24, 2003

(65) Prior Publication Data
US 2003/0227730 A1    Dec. 11, 2003

(30) Foreign Application Priority Data
Apr. 24, 2002  (JP) .................... P. 2002-121751
Apr. 24, 2002  (JP) .................... P. 2002-121752
Apr. 24, 2002  (JP) .................... P. 2002-121753

(51) Int. Cl.
H02H 3/08    (2006.01)

(52) U.S. Cl. .................................................. 361/93.7
(58) Field of Classification Search ................ 361/93.1
See application file for complete search history.

(56) References Cited

U.S. PATENT DOCUMENTS

| | | | | |
|---|---|---|---|---|
| 4,057,842 A | * | 11/1977 | Bauman et al. ............. | 361/93.5 |
| 4,297,741 A | * | 10/1981 | Howell ...................... | 361/93.5 |
| 4,458,297 A | * | 7/1984 | Stopper et al. ............. | 361/771 |
| 4,727,318 A | * | 2/1988 | Sakai et al. .................. | 324/765 |
| 4,811,184 A | * | 3/1989 | Koninsky et al. ............. | 363/17 |
| 5,442,515 A | * | 8/1995 | Wallaert ...................... | 361/187 |
| 6,153,993 A | * | 11/2000 | Oomura et al. ............. | 318/434 |
| 6,313,593 B1 | * | 11/2001 | Matsubara et al. ......... | 318/434 |
| 6,362,964 B1 | * | 3/2002 | Dubhashi et al. ........... | 361/707 |
| 6,639,776 B1 | * | 10/2003 | Sudou et al. ............... | 361/93.7 |
| 6,639,924 B1 | * | 10/2003 | Kato et al. ................ | 372/38.02 |

FOREIGN PATENT DOCUMENTS

JP     02003077950 A  *  9/2001

* cited by examiner

Primary Examiner—Stephen W Jackson
Assistant Examiner—Ann Hoang
(74) Attorney, Agent, or Firm—Fish & Richardson P.C.

(57) ABSTRACT

An inverter circuit overcurrent protection device in which an overcurrent detection resistor (Rs) is incorporated in a hybrid integrated circuit, in which a detection voltage from the overcurrent detection resistor (Rs) is divided by voltage dividing resistors ($R_1$ and $R_2$) and is compared with a reference voltage in an overcurrent detection circuit, for carrying out an overcurrent protection, and an external resistor is connected in series or in parallel with one of the voltage dividing resistors ($R_1$ and $R_2$) to change a division ratio so that the level of overcurrent protection can be adjusted; and an embodiment wherein, in the vicinity of a current detection terminal, a first pad (P1) is connected to a detection voltage from the overcurrent detection resistance, a second pad (P2) is connected to a detection voltage from the amplifier, and a third pad (P3) is connected to the voltage dividing resistors, and a bonding wire (10) is connected between the current detection terminal one of said pads, to select one of a plurality of overcurrent protection devices.

7 Claims, 9 Drawing Sheets

INVERTED CIRCUIT OVERCURRENT PROTECTION DEVICE AND HYBRID INTEGRATED CIRCUIT DEVICE WITH THE SAME INCORPORATED

TECHNICAL FIELD

The present invention relates to an inverter circuit overcurrent protection device and, in particular, to an inverter circuit overcurrent protection device which makes the overcurrent protection level variable.

Moreover, the present invention relates to a hybrid integrated circuit device with the aforementioned inverter circuit overcurrent protection circuit and, in particular, to a hybrid integrated circuit device with a plurality of types of inverter circuit overcurrent protection circuits.

BACKGROUND

Inverter circuits are known which receive a reference signal input of a frequency related to a rotational speed setting signal and generate three pulse-width modulated sine waves each having a 120 degree phase difference. An overcurrent caused by motor overloading, a simultaneous ON condition of series switching elements or the like may be detected as an overcurrent detection signal by an overcurrent detection resistance and an overcurrent detection circuit which controls a protection operation. An appropriate overcurrent detection resistance value is selected depending on the characteristics and capacity of a motor to be controlled, for example, its overcurrent protection level must be set in the range of approximately 10A–50A. If the known type of inverter circuit were formed as a hybrid integrated circuit, including the overcurrent detection resistance, it would be necessary to prepare a large number of hybrid integrated circuits to provide the desired range of overcurrent protection levels.

SUMMARY

The present invention provides an inverter circuit overcurrent protection device in which a detection voltage from the overcurrent detection resistor is divided by voltage dividing resistors and is compared with a reference voltage in an overcurrent detection circuit, for carrying out overcurrent protection, and an external resistor is connected in series or in parallel with one of the internal voltage dividing resistors to change a division ratio so that the level of overcurrent protection can be adjusted.

In at least one embodiment, the present invention provides an inverter circuit overcurrent protection device in which a detection voltage from the overcurrent detection resistor is amplified and increased by an amplifier, the amplified detection voltage is divided by voltage dividing resistors and is compared with a reference voltage in an overcurrent detection circuit, for carrying out an overcurrent protection, and an external resistor is connected in series or in parallel with one of the voltage dividing resistors to change a division ratio so that the level of overcurrent protection can be adjusted.

In at least one embodiment, the present invention provides an inverter circuit overcurrent protection device in which the voltage dividing resistors are also incorporated in the single hybrid integrated circuit, which may be assembled on a common substrate—for example, an isolated metal substrate of the type disclosed in U.S. Pat. No. 5,321,299—and the overcurrent protection level can be adjusted by an addition of only the external resistor.

In at least one embodiment, the present invention provides an inverter circuit overcurrent protection device in which the external resistor is connected in series with one of the voltage dividing resistors, and the overcurrent protection level is lowered by increasing a divided voltage to be inputted into the overcurrent detection circuit.

In at least one embodiment, the present invention provides an inverter circuit overcurrent protection device in which the external resistor is connected in parallel with one of the voltage dividing resistors, and the overcurrent protection level is raised by decreasing a divided voltage to be inputted into the overcurrent detection circuit.

In at least one embodiment, the present invention provides a hybrid integrated circuit device with an inverter circuit overcurrent protection device incorporated, comprising: switching elements; a drive circuit for driving the switching elements; an overcurrent detection resistor connected to the switching elements; an amplifier for amplifying a detection voltage from the overcurrent detection resistor; voltage dividing resistors for dividing the detection voltage; and an overcurrent detection circuit which compares a divided detection voltage with a reference voltage for carrying out an overcurrent protection, wherein, in the vicinity of a current detection terminal, a pad connected to a detection voltage from the overcurrent detection resistance, a pad connected to a detection voltage from the amplifier, and a pad connected to the voltage dividing resistors are provided, and a bonding wire connection between the current detection terminal and each pad switches over to a plurality of overcurrent protection devices.

In at least one embodiment, the present invention provides a hybrid integrated circuit device with an inverter circuit overcurrent protection device incorporated in which, when the current detection terminal is connected via a bonding wire to the pad connected to a detection voltage from the overcurrent detection resistor, an overcurrent detection circuit is newly provided outside the hybrid integrated circuit device.

In at least one embodiment, the present invention provides a hybrid integrated circuit device with an inverter circuit overcurrent protection device incorporated in which, when the current detection terminal is connected to the pad connected via a bonding wire to a detection voltage from the amplifier, an overcurrent detection circuit is newly provided outside the hybrid integrated circuit device.

In at least one embodiment, the present invention provides a hybrid integrated circuit device with an inverter circuit overcurrent protection device incorporated in which, when the current detection terminal is connected via a bonding wire to the pad connected to the voltage dividing resistors, an amplifier for amplifying a detection voltage from the overcurrent detection resistor incorporated into the hybrid integrated circuit device, voltage dividing resistors for dividing the detection voltage, and an overcurrent detection circuit which compares a divided detection voltage with a reference voltage for carrying out an overcurrent protection are used, and to the current detection terminal, an external resistor is connected in series with the voltage dividing resistors to change a division ratio so as to adjust an overcurrent protection level.

In at least one embodiment, a detection voltage from the overcurrent detection resistor is divided by the voltage dividing resistors and is compared with a reference voltage in a comparator, for carrying out an overcurrent protection, and the external resistor is connected in series or in parallel with one of the voltage dividing resistors to change a division ratio so that the level of overcurrent protection can be adjusted, therefore, an inverter circuit overcurrent protection device which can adjust the overcurrent protection level by the external resistor even when the overcurrent detection resistor is incorporated into a hybrid integrated circuit.

In at least one embodiment, a detection voltage from the overcurrent detection resistor having a slight resistance value is amplified by the amplifier, the amplified detection voltage is divided by the voltage dividing resistors and is compared with a reference voltage in the comparator, for carrying out an overcurrent protection, and the external resistor is connected in series or in parallel with one of the voltage dividing resistors to change a division ratio so that the level of overcurrent protection can be adjusted, therefore, an inverter circuit overcurrent protection device which can adjust the overcurrent protection level by the external resistor even when the overcurrent detection resistor is incorporated into a hybrid integrated circuit.

In at least one embodiment, the present invention is advantageous in that the overcurrent protection level can be adjusted to be lowered by connecting the external resistor in series with one of the voltage dividing resistors. In particular, in a case where a direct current motor is a load, demagnetization of the direct current motor can be prevented by making the overcurrent protection level lower than its original initial value.

In at least one embodiment, the present invention is advantageous in that the overcurrent protection level can be adjusted to be raised by connecting the external resistor in parallel with one of the voltage dividing resistors. Previously, the overcurrent protection level had to be determined before incorporation of the overcurrent detection resistor into the hybrid integrated circuit, whereas in the present invention, the overcurrent protection level can be adjusted to be raised or, as mentioned above, can be adjusted to be lowered, therefore, an advantage also exists in that an arbitrary overcurrent protection level can be realized even when the number of inverter circuit device types is greatly decreased.

In at least one embodiment, according to the present invention, in a hybrid integrated circuit device into which: switching elements; a drive circuit for driving the switching elements; an overcurrent detection resistor connected to the switching elements; an amplifier for amplifying a detection voltage from the overcurrent detection resistor; voltage dividing resistors for dividing the detection voltage; and an overcurrent detection circuit which compares a divided detection voltage with a reference voltage for carrying out an overcurrent protection are incorporated, in the vicinity of a current detection terminal, a pad connected to a detection voltage from the overcurrent detection resistance, a pad connected to a detection voltage from the amplifier, and a pad connected to the voltage dividing resistors are provided, and a bonding wire connection between the current detection terminal and each pad switches over to a plurality of overcurrent protection devices.

As a result, an overcurrent protection circuit which functions based on a detection voltage from the overcurrent detection resistor, an overcurrent detection circuit which functions based on a detection voltage from the amplifier, and an overcurrent protection circuit which is incorporated into a hybrid integrated circuit device and lowers the overcurrent protection level by changing the division ratio of the voltage dividing resistors can be realized, therefore, an advantage exists in that the three types of overcurrent protection circuits can be selected in one hybrid integrated circuit device by bonding wire switching.

In at least one embodiment, when the current detection terminal is connected via a bonding wire to the pad connected to a detection voltage from the overcurrent detection resistor, an overcurrent detection circuit is newly provided outside the hybrid integrated circuit device, therefore, effects similar to a case where the overcurrent detection resistor is taken outside can be obtained.

In at least one embodiment, when the current detection terminal is connected to the pad connected via a bonding wire to a detection voltage from the amplifier, an overcurrent detection circuit is newly provided outside the hybrid integrated circuit device, therefore, the amplifier inside the hybrid integrated circuit device can be utilized, the reference voltage of the current detection circuit can be freely determined outside, and the overcurrent protection level can be arbitrarily set.

In at least one embodiment, when the current detection terminal is connected via a bonding wire to the pad connected to the voltage dividing resistors, an amplifier for amplifying a detection voltage from the overcurrent detection resistor incorporated into the hybrid integrated circuit device, voltage dividing resistors for dividing the detection voltage, and an overcurrent detection circuit which compares a divided detection voltage with a reference voltage for carrying out an overcurrent protection are used, and to the current detection terminal, an external resistor is connected in series with the voltage dividing resistors to change a division ratio so as to adjust an overcurrent protection level.

The details of several embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

FIRST EMBODIMENT

Figure 1:
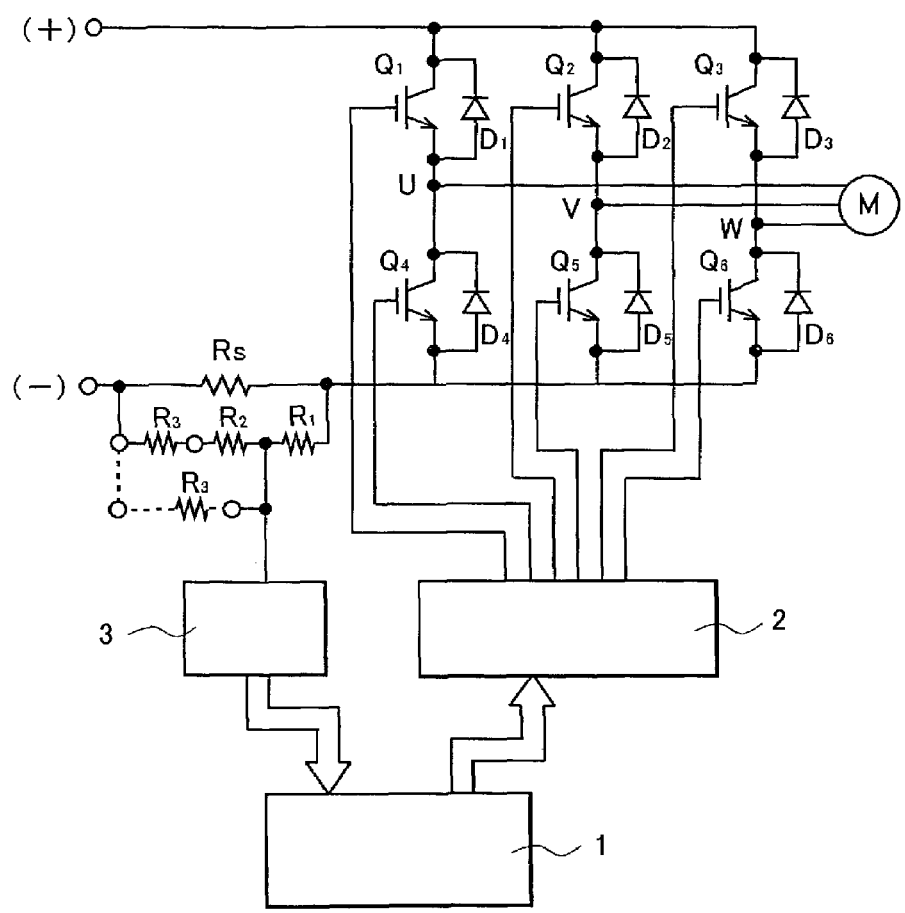
FIG. 1 is a block diagram of an inverter circuit overcurrent protection device according to a first embodiment of the present invention.

FIG. 1 shows a block diagram of an inverter circuit overcurrent protection device comprising upper arm switching elements Q1, Q2, and Q3 of an inverter circuit and lower arm switching elements Q4, Q5, and Q6; a driver circuit 2 for inputting into a control electrode of each switching element to control ON/OFF of the same switching element; and an overcurrent detection resistor Rs connected commonly in series with the lower arm switching elements Q4, Q5, and Q6. FIG. 1 also shows a load such as a motor M connected to output terminals of the inverter circuit, namely, nodes U, V, and W between the switching elements Q1 and Q4, the switching elements Q2 and Q5, and the switching elements Q3 and Q6. From a control circuit 1, pulse-width modulated sine waves are outputted to the drive circuit 2, whereby the inverter circuit is controlled.

The present embodiment is characterized in that voltage dividing resistors $R_1$ and $R_2$ are arranged in parallel with the overcurrent detection resistor Rs and an external resistor $R_3$ is connected in series or in parallel with one of the voltage dividing resistors. A detection voltage from the overcurrent detection resistor Rs is divided by the dividing resistors and is compared, in the overcurrent detection circuit 3, with its reference voltage, and if the divided voltage exceeds the reference voltage, an overcurrent detection signal is outputted, whereby pulse-width modulated sine waves to be supplied to the drive circuit 2 are stopped in the control circuit 1, for carrying out a protection operation.

When the external resistor $R_3$ is connected in series to the voltage dividing resistor $R_2$ of the voltage dividing resistors $R_1$ and $R_2$, a division ratio of the node between the voltage dividing resistors $R_1$ and $R_2$ rises due to the external resistor $R_3$, resulting in $(R_2+R_3)/(R_1+R_2+R_3)$. Accordingly, if an overcurrent protection level is set to, for example, 10A with no external resistor $R_3$ (0Ω), the overcurrent protection level can be adjusted to, for example, 8A by a series connection of the external resistor $R_3$. As such, the overcurrent protection level can be adjusted to a smaller level by selecting a resistance voltage of the external resistor $R_3$.

In addition, when the external resistor $R_3$ is connected in parallel with the voltage dividing resistor $R_2$ of the voltage dividing resistors $R_1$ and $R_2$, a division ratio of the node between the voltage dividing resistors $R_1$ and $R_2$ decreases due to the external resistor $R_3$, resulting in $(R_2 \cdot R_3)/(R_1 \cdot R_2 + R_2 \cdot R_3 + R_3 \cdot R_1)$. Accordingly, if an overcurrent protection level is set to, for example, 10A with no external resistor $R_3$, the overcurrent protection level can be adjusted to, for example, 12A by a parallel connection of the external resistor $R_3$. Although the overcurrent protection level can be adjusted to a greater level by selecting a resistance voltage of the external resistor $R_3$, in order to raise the overcurrent protection level, an improvement in characteristics of the switching elements is required, therefore, an adjustment for a slight increase within the range to an upper limit determined based on switching element characteristics is convenient.

Figure 2:
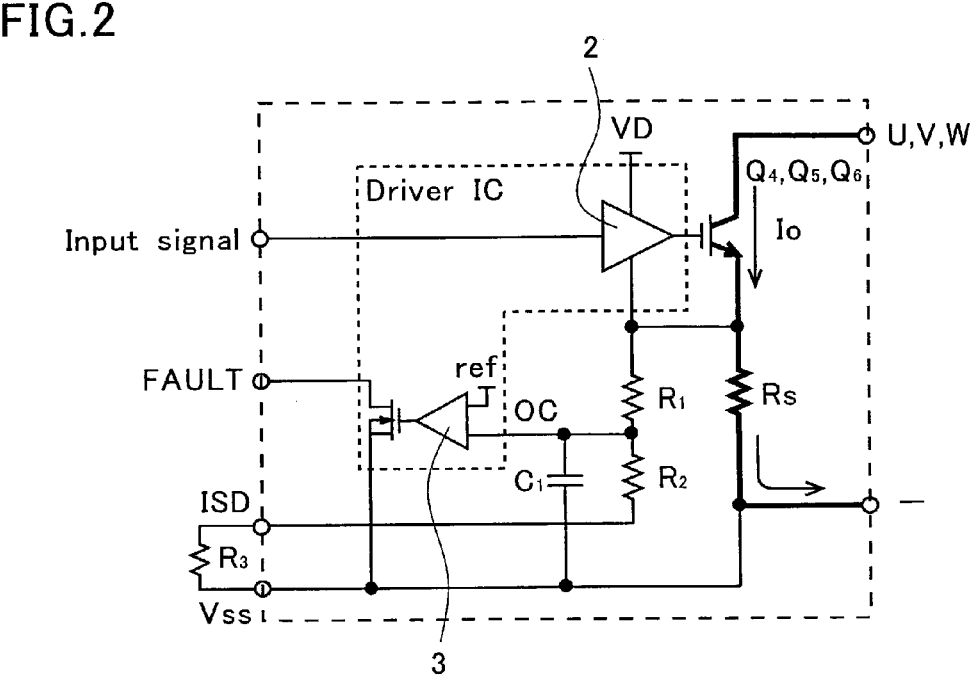
FIG. 2 is a circuit diagram of an inverter circuit overcurrent protection device according to a first embodiment of the present invention.

Furthermore, FIG. 2 shows a detailed circuit diagram of an inverter circuit overcurrent protection device of the present embodiment for lowering the overcurrent protection level.

Switching elements Q4, Q5, and Q6 compose a lower arm of an inverter circuit of the present embodiment, and an overcurrent detection resistor Rs is connected commonly in series with the switching elements Q4, Q5, and Q6. To control electrodes of the switching elements Q4, Q5, and Q6, a driver circuit 2 is connected, and a control signal of pulse-width modulated sine waves to drive the inverter circuit is supplied from a control circuit 1 via an input signal terminal.

Voltage dividing resistors $R_1$ and $R_2$ are connected in parallel with the overcurrent detection resistor Rs, one end of the voltage dividing resistor $R_2$ is connected to an external terminal ISD, and an external resistor $R_3$ is connected between the same and an external terminal Vss. The divided voltage can be adjusted by the external resistor $R_3$.

An overcurrent detection circuit 3 is composed of a comparator, and receives a reference voltage ref input at one input terminal, and, at the other input terminal, a divided voltage input of a node between the voltage dividing resistors $R_1$ and $R_2$. An output of the comparator is applied to a control electrode of a MOS semiconductor element to output an overcurrent detection signal, and upon outputting the overcurrent detection signal, this MOS semiconductor element is turned ON to transmit a protection operation signal FAULT to the control circuit 1, while the same carries out a protection operation to stop supplying a control signal to control the inverter circuit to the driver circuit 2 for a fixed period of time.

In the aforementioned inverter circuit overcurrent protection device, a divided voltage of the node between the voltage dividing resistors $R_1$ and $R_2$ can be adjusted to a larger value by a function of the external resistor $R_3$, therefore, when a current which flows through the overcurrent detection resistor Rs becomes large, since the reference voltage 3 is immediately exceeded at the overcurrent detection circuit 3, the overcurrent protection level can be adjusted to a smaller level. Accordingly, the overcurrent protection level set to, for example, 10A only with the voltage dividing resistors $R_1$ and $R_2$ can be lowered to, for example, 8A by an addition of the external resistor $R_3$.

In FIG. 2, a region surrounded by an outer thick dotted line shows a single hybrid integrated circuit, and a region surrounded by an inner thin dotted line shows a driver IC. Switching elements Q1, Q2, Q3, Q4, Q5, and Q6, an overcurrent detection resistor Rs, voltage dividing resistors $R_1$ and $R_2$, and the driver IC containing a driver circuit 2 and an overcurrent detection circuit 3 are integrally incorporated into this hybrid integrated circuit. An external resistor $R_3$ can be additionally connected later to the outside of the hybrid integrated circuit.

Figure 3:
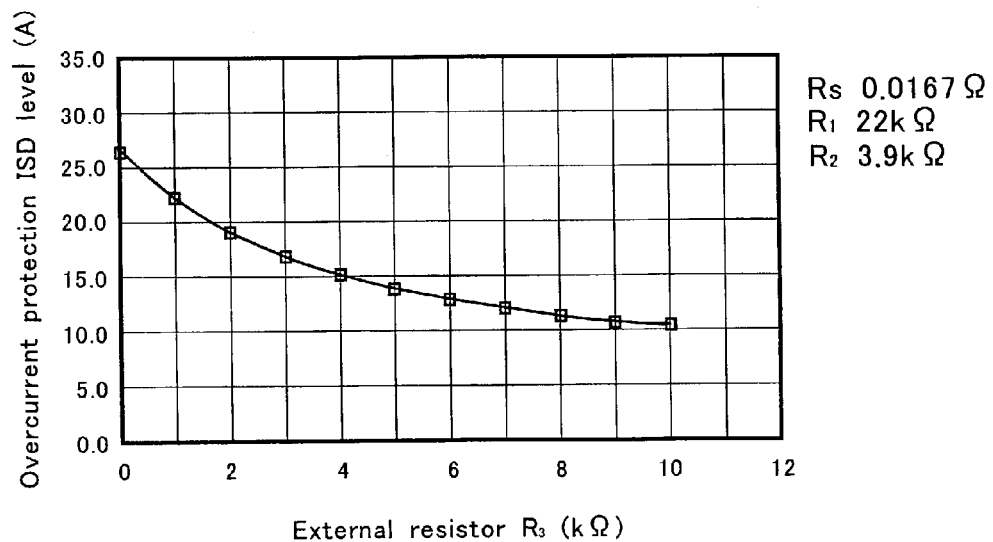
FIG. 3 is a characteristics diagram of the overcurrent protection level of an inverter circuit overcurrent protection device according to a first embodiment of the present invention.

A detailed relationship between the overcurrent protection level and external resistor $R_3$ is shown with reference to FIG. 3. In this inverter circuit overcurrent protection device, an overcurrent detection resistor Rs (0.0167Ω), a voltage dividing resistor $R_1$ (22 kΩ), and a voltage dividing resistor $R_2$ (3.9 kΩ) have been set, and the overcurrent protection level becomes 26.93A when the external resistor $R_3$ is short-circuited, and if the external resistor $R_3$ is set to 2 k$\Omega$, the overcurrent protection level can be lowered to 19.18A. When the resistance value of the external resistor $R_3$ is increased, the overcurrent protection level is lowered as illustrated.

Figure 4:
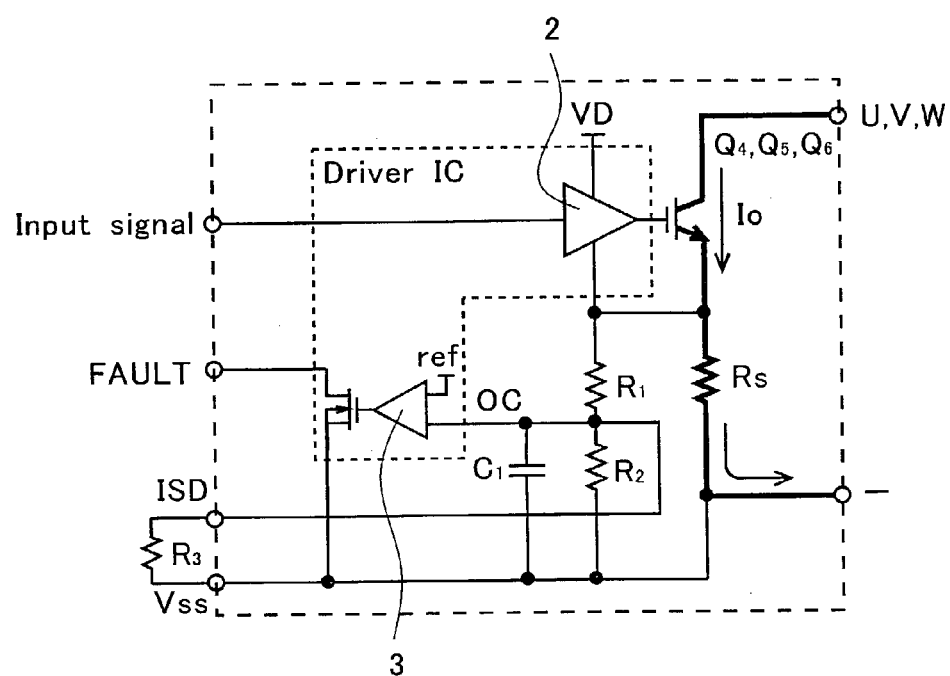
FIG. 4 is a circuit diagram of an inverter circuit overcurrent protection device according to a first embodiment of the present invention.

FIG. 4 shows a detailed circuit diagram of an inverter circuit overcurrent protection device of the present embodiment for increasing the overcurrent protection level.

Switching elements Q4, Q5, and Q6 compose a lower arm of an inverter circuit of the present embodiment. An overcurrent detection resistor Rs is connected commonly in series with the switching elements Q4, Q5, and Q6. A driver circuit 2 is connected to control electrodes of the switching elements Q4, Q5, and Q6, and a control signal of pulse-width modulated sine waves to drive the inverter circuit is supplied from a control circuit 1 via an input signal terminal. Voltage dividing resistors $R_1$ and $R_2$ are connected in parallel with the overcurrent detection resistor Rs, a node between the voltage dividing resistors $R_1$ an $R_2$ is connected to an external terminal ISD, and between the same and an external terminal Vss, an external resistor $R_3$ is connected to become parallel with the dividing resistor $R_2$. The divided voltage can be adjusted by the external resistor $R_3$.

An overcurrent detection circuit 3 is composed of a comparator, and receives a reference voltage ref input at one input terminal, and, at the other input terminal, a divided voltage input of a node between the voltage dividing resistors $R_1$ and $R_2$. An output of the comparator is applied to a control electrode of a MOS semiconductor element to output an overcurrent detection signal, and upon outputting the overcurrent detection signal, this MOS semiconductor element is turned ON to transmit a protection operation signal FAULT to the control circuit 1, while the same carries out a protection operation to stop supplying a control signal to control the inverter circuit to the driver circuit 2 for a fixed period of time.

In the aforementioned inverter circuit overcurrent protection device, a divided voltage of the node between the voltage dividing resistors $R_1$ and $R_2$ can be adjusted to a smaller value by a function of the external resistor $R_3$, therefore, when a current which flows through the overcurrent detection resistor Rs becomes large, since the reference voltage 3 is exceeded at the overcurrent detection circuit 3, the overcurrent protection level can be adjusted to a smaller level. Accordingly, the overcurrent protection level set to, for example, 10A only with the voltage dividing resistors $R_1$ and $R_2$ can be increased to, for example, 12A by an addition of the external resistor $R_3$.

Moreover, in FIG. 4, similar to FIG. 2, switching elements Q1, Q2, Q3, Q4, Q5, and Q6, an overcurrent detection resistor Rs, voltage dividing resistors $R_1$ and $R_2$, and a driver IC containing a driver circuit and an overcurrent detection circuit are integrally incorporated into a hybrid integrated circuit, and an external resistor $R_3$ can be additionally connected later to the outside of the hybrid integrated circuit.

SECOND EMBODIMENT

Figure 5:
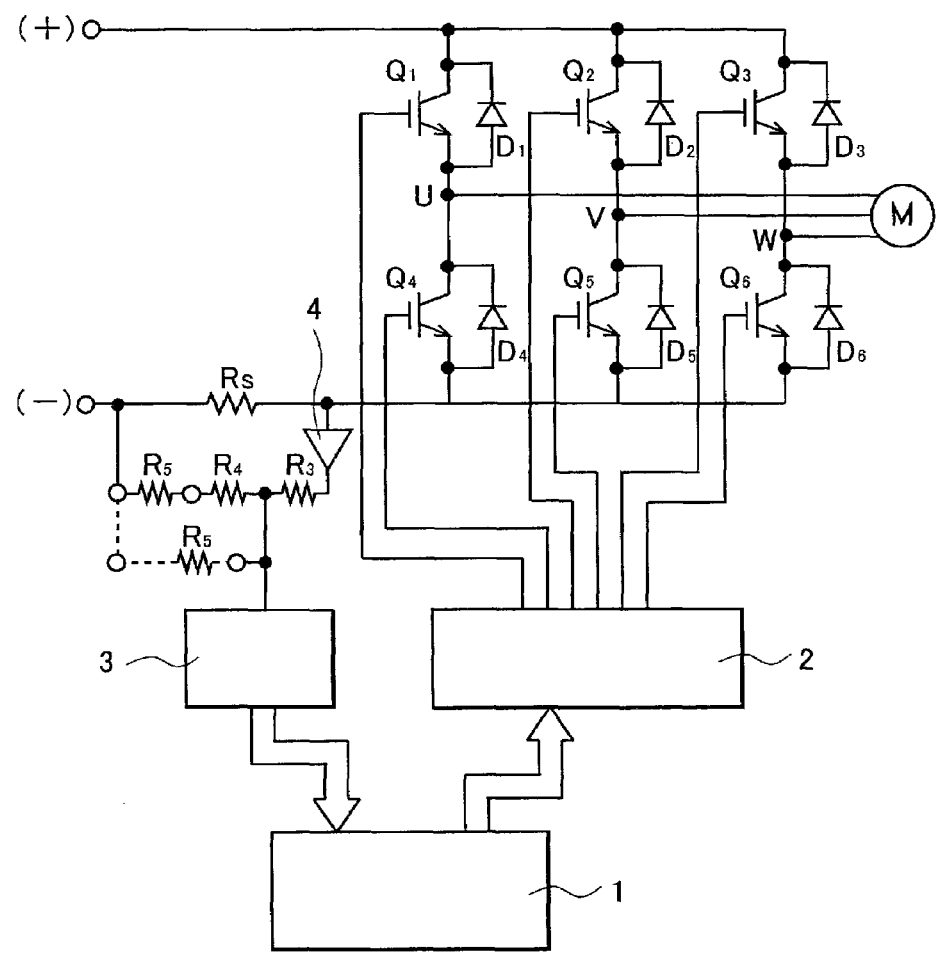
FIG. 5 is a block diagram of an inverter circuit overcurrent protection device according to a second embodiment of the present invention.

FIG. 5 shows a block diagram of an inverter circuit overcurrent protection device of the second embodiment, comprising upper arm switching elements Q1, Q2, and Q3 of an inverter circuit and lower arm switching elements Q4, Q5, and Q6; a driver circuit 2 for inputting into a control electrode of each switching element to control ON/OFF of the same switching element; an overcurrent detection resistor Rs connected commonly in series with the lower arm switching elements Q4, Q5, and Q6. FIG. 5 also shows a load such as a motor M connected to output terminals of the inverter circuit, namely, nodes U, V, and W between the switching elements Q1 and Q4, the switching elements Q2 and Q5, and the switching elements Q3 and Q6. From a control circuit 1, as mentioned above, pulse-width modulated sine waves are outputted to the drive circuit 2, whereby the inverter circuit is controlled.

The present embodiment is characterized in that a detection voltage from an overcurrent detection resistor Rs is amplified approximately tenfold by an amplifier 4, and the amplified detection voltage is divided by voltage dividing resistors $R_3$ and $R_4$ and an external resistor $R_5$ connected in series or in parallel with one of the voltage dividing resistors. The amplified detection voltage is divided by the dividing resistors and is compared, in the overcurrent detection circuit 3, with its reference voltage, and if the divided voltage exceeds the reference voltage, an overcurrent detection signal is outputted, whereby pulse-width modulated sine waves to be supplied to the drive circuit 2 are stopped in the control circuit 1, for carrying out the protection operation.

When the external resistor $R_5$ is connected in series to the voltage dividing resistor $R_4$ of the voltage dividing resistors $R_3$ and $R_4$, a division ratio of the node between the voltage dividing resistors $R_3$ and $R_4$ rises due to the external resistor $R_5$, resulting in $(R_4+R_5)/(R_3+R_4+R_5)$. Accordingly, if an overcurrent protection level is set to, for example, 10A without an external resistor $R_5$ (0$\Omega$), the overcurrent protection level can be adjusted to, for example, 8A by a series connection of the external resistor $R_5$. As such, the overcurrent protection level can be adjusted to a smaller level by selecting a resistance voltage of the external resistor $R_5$.

In addition, when the external resistor $R_5$ is connected in parallel with the voltage dividing resistor $R_4$ of the voltage dividing resistors $R_3$ and $R_4$, a division ratio of the node between the voltage dividing resistors $R_3$ and $R_4$ decreases due to the external resistor $R_5$, resulting in $(R_4 \cdot R_5)/(R_3 \cdot R_4 + R_4 \cdot R_5 + R_5 \cdot R_3)$. Accordingly, if an overcurrent protection level is set to, for example, 10A without an external resistor $R_5$, the overcurrent protection level can be adjusted to, for example, 12A by a parallel connection of the external resistor $R_5$. Although the overcurrent protection level can be adjusted to a greater level by selecting a resistance voltage of the external resistor $R_5$, in order to raise the overcurrent protection level, an improvement in characteristics of the switching elements is required, therefore, an adjustment for a slight increase within the range to an upper limit determined based on switching element characteristics is convenient.

Figure 6:
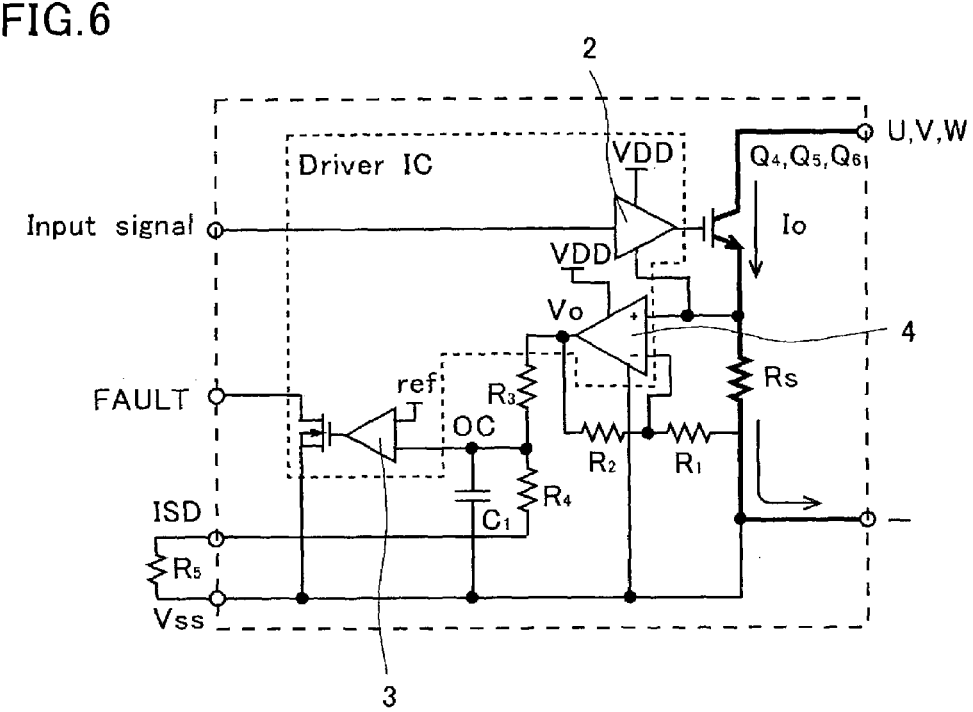
FIG. 6 is a circuit diagram of an inverter circuit overcurrent protection device according to a second embodiment of the present invention.

FIG. 6 shows a detailed circuit diagram of an inverter circuit overcurrent protection device of the present embodiment for lowering the overcurrent protection level. Switching elements Q4, Q5, and Q6 compose a lower arm of an inverter circuit of the present embodiment, and an overcurrent detection resistor Rs is connected commonly in series with the switching elements Q4, Q5, and Q6. A driver circuit 2 is connected to control electrodes of the switching elements Q4, Q5, and Q6 and a control signal of pulse-width modulated sine waves to drive the inverter circuit is supplied from a control circuit 1 via an input signal terminal.

The detection voltage from the overcurrent detection resistor Rs is amplified approximately tenfold by an amplifier 4. An operational amplifier is used as the amplifier 4; a detection voltage from the overcurrent detection resistor Rs is inputted into a non-inverting input terminal (+); a feedback resistor $R_1$ is connected between an inverting input terminal (−); and a ground potential Vss; and a feedback resistor $R_2$ is connected between the inverting input terminal (−) and an output terminal. By such a connection, an output voltage $V_0$ of the amplifier 4 can be defined as follows.

$$V_0=(1+R_2/R_1)(I_0Rs-Vos)$$

$I_0$ represents a current that flows through the switching elements, and Vos represents an offset voltage of the operational amplifier.

Accordingly, the feedback resistors $R_1$ and $R_2$ are set so that a detection voltage $I_0Rs$ generated at the overcurrent detection voltage Rs is amplified approximately tenfold by the amplifier 4. For example, where the overcurrent protection level is provided as 20A and Rs is provided as 0.0167Ω, the detection voltage $I_0Rs$ is 0.334V, and where the feedback resistor $R_1$ is 3.9 kΩ and the feedback resistor $R_2$ is 22 kΩ, the voltage after being amplified by the amplifier 4 becomes approximately 2.22V.

This amplified detection voltage from the amplifier 4 is applied to voltage dividing resistors $R_3$ and $R_4$, and one end of the voltage dividing resistor $R_4$ is connected to an external terminal ISD, and between the same and an external terminal Vss, an external resistor $R_5$ is connected. The divided voltage can be adjusted by the external resistor $R_5$.

An overcurrent detection circuit 3 is composed of a comparator, and receives a reference voltage ref input at one input terminal, and, at the other input terminal, a divided voltage input of a node between the voltage dividing resistors $R_3$ and $R_4$. An output of the comparator is applied to a control electrode of a MOS semiconductor element to output an overcurrent detection signal, and upon outputting the overcurrent detection signal, this MOS semiconductor element is turned ON to transmit a protection operation signal FAULT to the control circuit 1, while the same carries out a protection operation to stop supplying a control signal to control the inverter circuit to the driver circuit 2 for a fixed period of time.

The divided voltage of the node between the voltage dividing resistors $R_3$ and $R_4$ can be adjusted to a larger value by a function of the external resistor $R_5$; therefore, when a current which flows through the overcurrent detection resistor Rs becomes large, since the reference voltage is immediately exceeded at the overcurrent detection circuit 3, the overcurrent protection level can be adjusted to a smaller level. Accordingly, the overcurrent protection level set to, for example, 10A only with the voltage dividing resistors $R_3$ and $R_4$ can be lowered to, for example, 8A by an addition of the external resistor $R_5$.

In FIG. 6, a region surrounded by an outer thick dotted line shows a single hybrid integrated circuit, and a region surrounded by an inner thin dotted line shows a driver IC. Switching elements Q1, Q2, Q3, Q4, Q5, and Q6, an overcurrent detection resistor Rs, an amplifier 4, voltage dividing resistors $R_3$ and $R_4$, and the driver IC containing a driver circuit 2 and an overcurrent detection circuit 3 are integrally incorporated into this hybrid integrated circuit. An external resistor $R_5$ can be additionally connected later to the hybrid integrated circuit.

Figure 7:
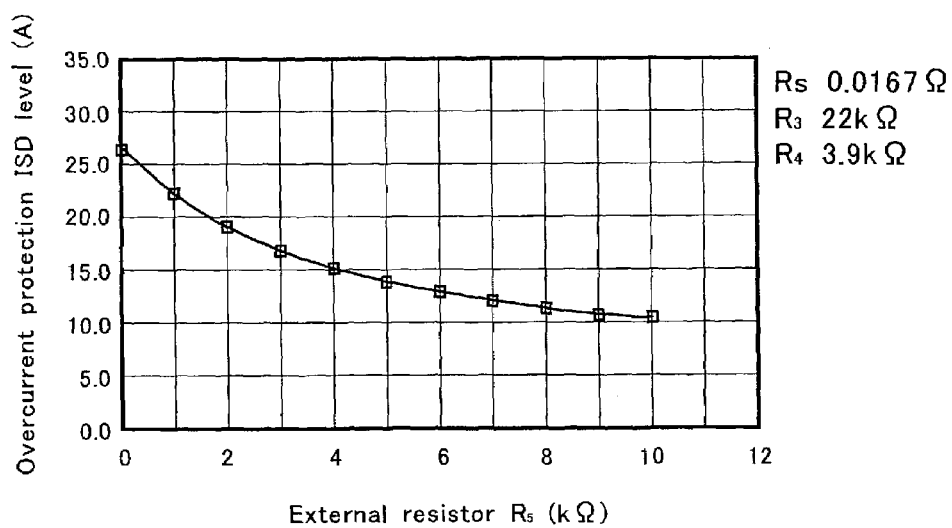
FIG. 7 is a characteristics diagram of the overcurrent protection level of an inverter circuit overcurrent protection device according to a second embodiment of the present invention.

A detailed relationship between the overcurrent protection level and external resistor $R_5$ is shown with reference to FIG. 7. In this inverter circuit overcurrent protection device, an overcurrent detection resistor Rs (0.0167Ω), a voltage dividing resistor $R_3$ (22 kΩ), and a voltage dividing resistor $R_4$ (3.9 kΩ) have been set, and the overcurrent protection level becomes 26.93A when the external resistor $R_5$ is short-circuited, and if the external resistor $R_5$ is set to 2 kΩ, the overcurrent protection level can be lowered to 19.18A.

When the resistance value of the external resistor $R_5$ is increased, the overcurrent protection level is lowered as illustrated.

Figure 8:
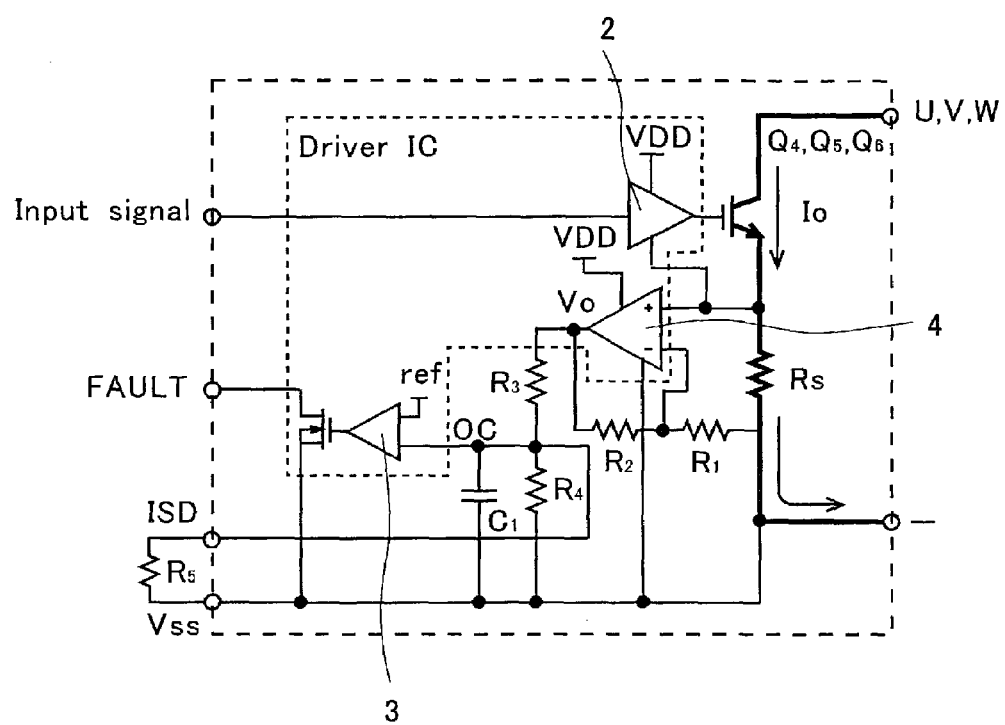
FIG. 8 is a circuit diagram of an inverter circuit overcurrent protection device according to a second embodiment of the present invention.

FIG. 8 shows a detailed circuit diagram of an inverter circuit overcurrent protection device of the present embodiment for increasing the overcurrent protection level.

Switching elements Q4, Q5, and Q6 compose a lower arm of an inverter circuit of the present embodiment, and an overcurrent detection resistor Rs is connected commonly in series with the switching elements Q4, Q5, and Q6. A driver circuit 2 is connected to control electrodes of the switching elements Q4, Q5, and Q6. A control signal of pulse-width modulated sine waves to drive the inverter circuit is supplied from a control circuit 1 via an input signal terminal. A detection voltage from the overcurrent detection resistor Rs is amplified approximately tenfold by an amplifier 4. This amplified detection voltage is applied to voltage dividing resistors $R_3$ and $R_4$. A node between the voltage dividing resistors $R_3$ and $R_4$ is connected to an external terminal ISD. An external resistor $R_5$ is connected to become parallel with the voltage dividing resistor $R_4$ between terminal ISD and an external terminal Vss,. The divided voltage can be adjusted by the external resistor $R_5$.

An overcurrent detection circuit 3 in FIG. 8 is composed of a comparator. It receives a reference voltage ref input at one input terminal and, at the other input terminal, a divided voltage input of a node between the voltage dividing resistors $R_3$ and $R_4$. An output of the comparator is applied to a control electrode of a MOS semiconductor element to output an overcurrent detection signal, and upon outputting the overcurrent detection signal, this MOS semiconductor element is turned ON to transmit a protection operation signal FAULT to the control circuit 1, while the same carries out a protection operation to stop supplying a control signal to control the inverter circuit to the driver circuit 2 for a fixed period of time.

The divided voltage of the node between the voltage dividing resistors $R_3$ and $R_4$ can be adjusted to a smaller value by a function of the external resistor $R_5$; therefore, when a current which flows through the overcurrent detection resistor Rs becomes large, since the reference voltage is exceeded at the overcurrent detection circuit 3, the overcurrent protection level can be adjusted to a smaller level. Accordingly, the overcurrent protection level set to, for example, 10A only with the voltage dividing resistors $R_3$ and $R_4$ can be increased to, for example, 12A by an addition of the external resistor $R_5$.

Moreover, in FIG. 8, similar to FIG. 6, switching elements Q1, Q2, Q3, Q4, Q5, and Q6, an overcurrent detection resistor Rs, an amplifier 4, voltage dividing resistors $R_3$ and $R_4$, and a driver IC containing a driver circuit 2 and an overcurrent detection circuit are integrally incorporated into a single hybrid integrated circuit. An external resistor $R_5$ can be additionally connected later to the outside of the hybrid integrated circuit.

THIRD EMBODIMENT

Figure 9:
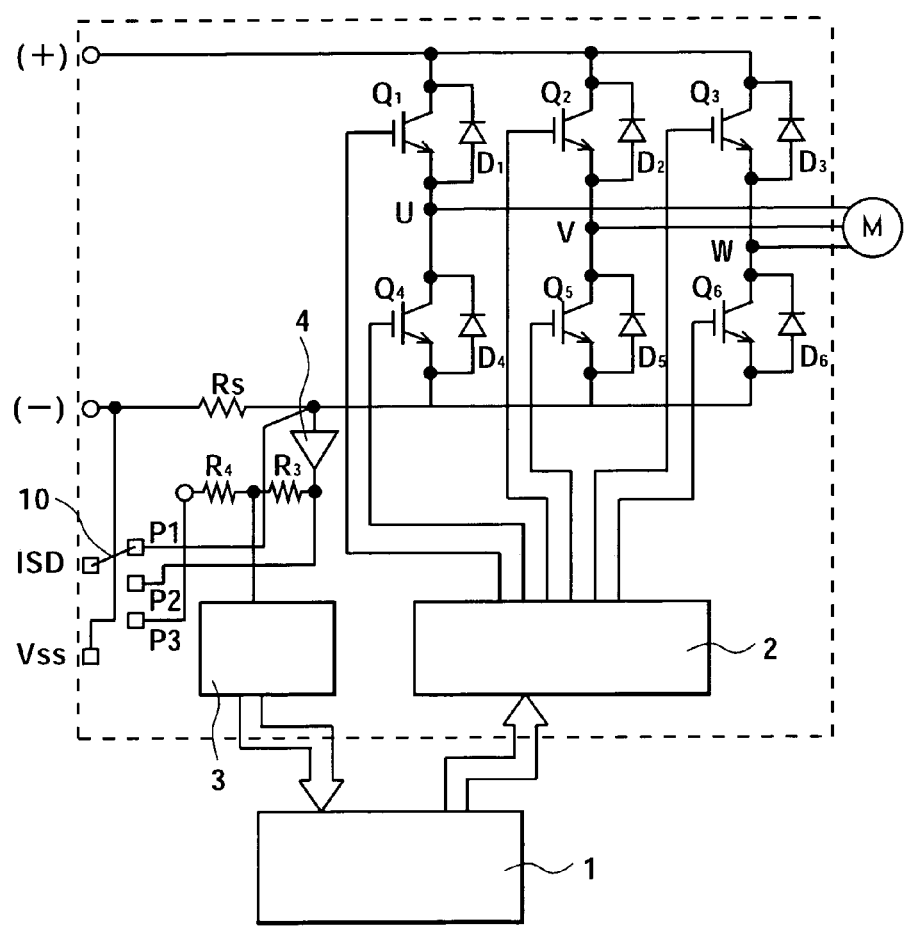
FIG. 9 is a block diagram of a hybrid integrated circuit device with an overcurrent protection circuit incorporated according to a third embodiment of the present invention.

FIG. 9 shows a block diagram of a hybrid integrated circuit device with an overcurrent protection circuit incorporated according to the third embodiment. The inverter circuit comprises: upper arm switching elements Q1, Q2, and Q3 of an inverter circuit and lower arm switching elements Q4, Q5, and Q6; a driver circuit 2 for inputting into a control electrode of each switching element to control ON/OFF of the same switching element; an overcurrent detection resistor Rs connected commonly in series with the lower arm switching elements Q4, Q5, and Q6. FIG. 9 also shows a load such as a motor M connected to output terminals of the inverter circuit, namely, nodes U, V, and W between the switching elements Q1 and Q4, the switching elements Q2 and Q5, and the switching elements Q3 and Q6. From a control circuit 1, as mentioned above, pulse-width modulated sine waves are outputted to the drive circuit 2, whereby the inverter circuit is controlled. The region surrounded by a dotted line is incorporated into a hybrid integrated circuit device.

Furthermore, a current detection terminal ISD is provided at a substrate end portion of the hybrid integrated circuit device, and in the vicinity thereof, a first pad P1, a second pad P2, and a third pad P3 are arranged. These pads are preferably formed by etching a conductive foil such as a copper foil adhered on the substrate. The first pad P1 is connected to a detection voltage of an overcurrent detection resistor Rs, the second pad P2 is connected to an output of an amplifier 4, and the third pad P3 is connected to one end of the voltage dividing resistors $R_3$ and $R_4$ for dividing output voltage of the amplifier 4. By selectively connecting the current detection terminal ISD to any of the pads P1, P2, and P3 via a bonding wire 10, a plurality of types of overcurrent protection devices can be selectively formed.

Figure 10:
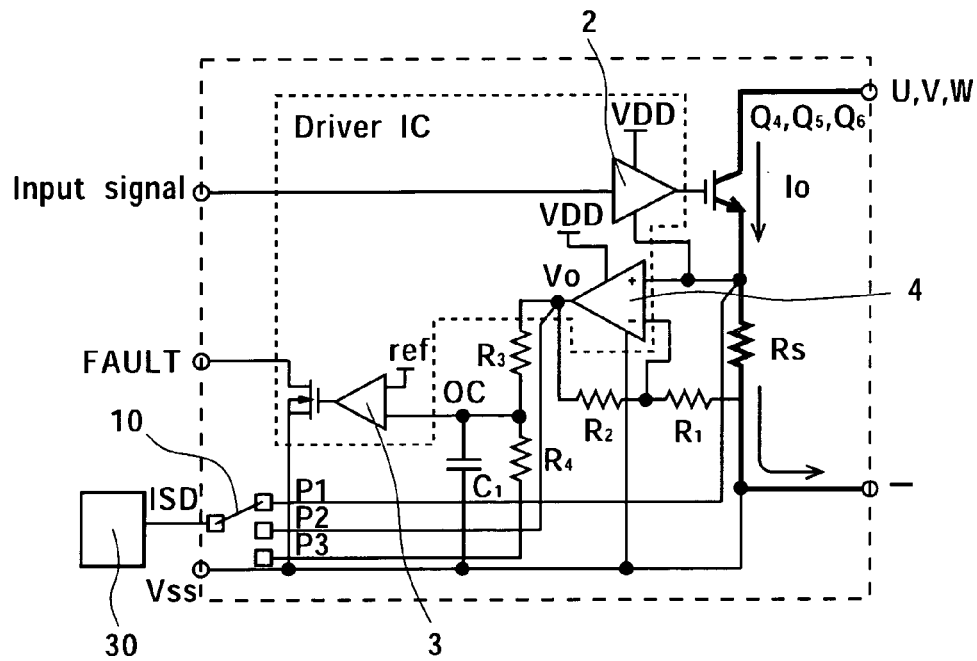
FIG. 10 is a circuit diagram of a hybrid integrated circuit device with an overcurrent protection circuit incorporated according to a third embodiment of the present invention.

FIG. 10 shows a further detailed block diagram of a hybrid integrated circuit device with an overcurrent protection circuit incorporated according to the present embodiment.

Switching elements Q4, Q5, and Q6 compose a lower arm of an inverter circuit of the present embodiment, and an overcurrent detection resistor Rs is connected commonly in series with the switching elements Q4, Q5, and Q6. A driver circuit 2 is connected to control electrodes of the switching elements Q4, Q5, and Q6. A control signal of pulse-width modulated sine waves to drive the inverter circuit is supplied from a control circuit 1 via an input signal terminal.

A detection voltage from the overcurrent detection resistor Rs is amplified approximately tenfold by an amplifier 4. An operational amplifier is used as the amplifier 4. A detection voltage from the overcurrent detection resistor Rs is inputted into a non-inverting input terminal (+), a feedback resistor $R_1$ is connected between an inverting input terminal (−) and a ground potential Vss, and a feedback resistor $R_2$ is connected between the inverting input terminal (−) and an output terminal. By such a connection, an output voltage $V_0$ of the amplifier 4 can be defined as follows:

$$V_0 = (1 + R_2/R_1)(I_0 Rs - Vos)$$

$I_0$ represents a current that flows through the switching elements, and Vos represents an offset voltage of the operational amplifier.

Accordingly, the feedback resistors $R_1$ and $R_2$ are set so that a detection voltage $I_0 Rs$ generated at the overcurrent detection voltage Rs is amplified approximately tenfold by the amplifier 4. For example, where the overcurrent protection level is provided as 20A and Rs is provided as 0.0167Ω, the detection voltage $I_0 Rs$ is 0.334V, and where the feedback resistor $R_1$ is 3.9 kΩ and the feedback resistor $R_2$ is 22 kΩ, the voltage after being amplified by the amplifier 4 becomes approximately 2.22V.

Furthermore, the detection voltage from the overcurrent detection resistor Rs is amplified approximately tenfold by the amplifier 4, and the amplified detection voltage is divided by means of the voltage dividing resistors $R_3$ and $R_4$. The amplified detection voltage after being divided by the voltage dividing resistors is compared, in an overcurrent detection circuit 3, with its reference, and if the divided voltage exceeds the reference voltage, an overcurrent detection signal is outputted, whereby pulse-width modulated sine waves supplied to the drive circuit 2 are stopped in the control circuit 1, for carrying out a protection operation.

In FIG. 10, a region surrounded by an outer thick dotted line shows a single hybrid integrated circuit, and a region surrounded by an inner thin dotted line shows a driver IC. Switching elements Q1, Q2, Q3, Q4, Q5, and Q6, an overcurrent detection resistor Rs, an amplifier 4, voltage dividing resistors $R_3$ and $R_4$, and the driver IC containing a driver circuit 2 and an overcurrent detection circuit 3 are integrally incorporated into this hybrid integrated circuit. An external resistor $R_5$ can be additionally connected later to the outside of the hybrid integrated circuit.

The present embodiment is characterized in that a first pad P1 connected to the overcurrent detection resistor Rs, a second pad P2 connected to an output voltage of the amplifier 4, and a third pad P3 connected to one end of the voltage dividing resistors are provided in the vicinity of a current detection terminal ISD. This current detection terminal ISD and three pads are selectively connected via a bonding wire 10, whereby three types of overcurrent protection circuits can be provided.

First, as shown in FIG. 10, when the current detection terminal ISD and the first pad P1 connected to the overcurrent detection resistor Rs are connected via the bonding wire 10, an actual detection voltage from the overcurrent detection resistor Rs is outputted to the current detection terminal ISD. Since this detection voltage is small, that is, approximately 0.3V, overcurrent detection at a desirable reference voltage can be carried out by providing a customer-use current detection circuit 30 outside the hybrid integrated circuit device. Accordingly, an amplifier, voltage dividing resistors, and a current detection circuit are all externally provided, therefore, the amplifier 4, voltage dividing resistors $R_3$ and $R_4$, and current detection circuit 3 provided inside the hybrid integrated circuit device are not used. A detection voltage from the overcurrent detection terminal ISD is compared with an arbitrary reference voltage by the current detection circuit 30 provided outside the hybrid integrated circuit device, for carrying out an overcurrent protection. In this method, since the reference voltage of the current detection circuit 30 can be arbitrarily set, effects similar to those in the case where the overcurrent detection resistor Rs is externally provided can be provided. Moreover, since the detection voltage from the overcurrent detection resistor Rs is small, an amplifier and voltage dividing resistors may be added, if desired.

Figure 11:
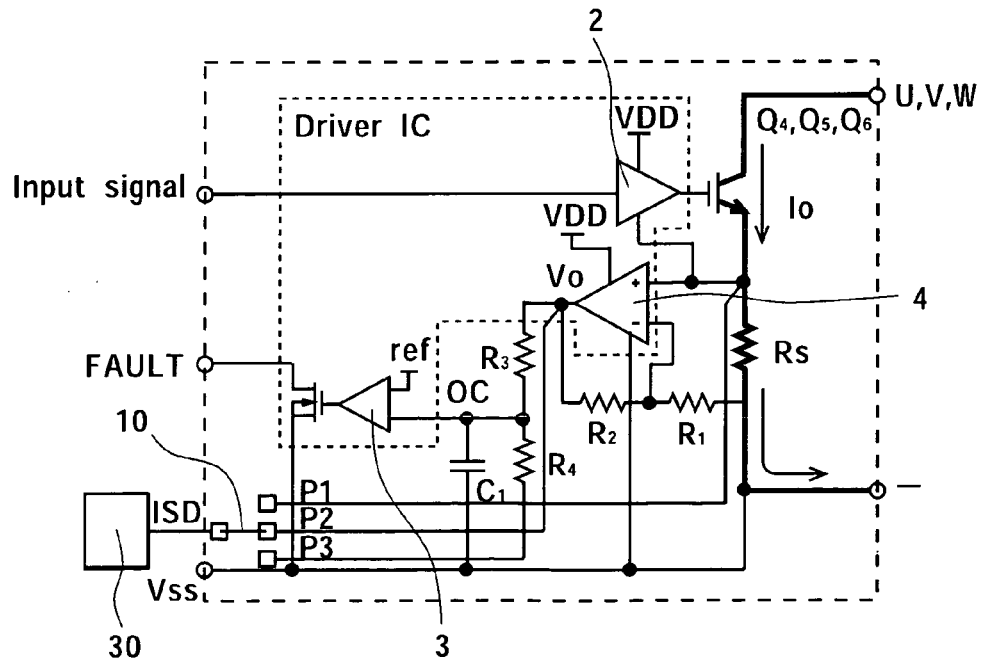
FIG. 11 is a circuit diagram of a hybrid integrated circuit device with an overcurrent protection circuit incorporated according to a third embodiment of the present invention.

As shown in FIG. 11, when the current detection terminal ISD and the second pad P2 connected to the output voltage of the amplifier 4 are connected via the bonding wire 10, a detection voltage from the overcurrent detection resistor Rs amplified approximately tenfold by the amplifier 4 is outputted to the current detection terminal ISD. Since this detection voltage is large, that is, approximately 2–3V, overcurrent detection at a desirable reference voltage can be carried out by providing a customer-use current detection circuit 30 outside the hybrid integrated circuit device. Accordingly, voltage dividing resistors and a current detection circuit 30 are all externally provided, therefore, voltage dividing resistors $R_3$ and $R_4$ and current detection circuit 3 provided inside the hybrid integrated circuit device are not used.

In this method, the amplifier 4 incorporated inside the hybrid integrated circuit device can be utilized, an amplified detection voltage from the overcurrent detection terminal ISD is compared with an arbitrary reference voltage by the current detection circuit 30 provided outside the hybrid integrated circuit device, for carrying out an overcurrent protection.

Figure 12:
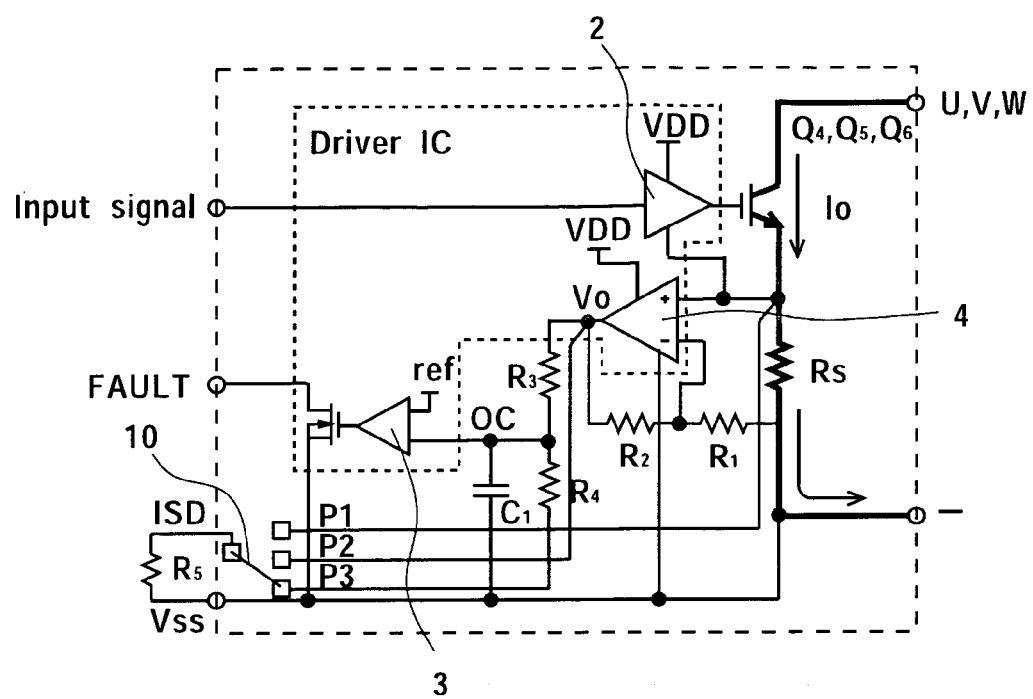
FIG. 12 is a circuit diagram of a hybrid integrated circuit device with an overcurrent protection circuit incorporated according to a third embodiment of the present invention.

Furthermore, as shown in FIG. 12, when the current detection terminal ISD and the third pad P3 connected to one end of the voltage dividing resistors are connected via the bonding wire 10, the amplifier, voltage dividing resistors, and current detection circuit provided inside the hybrid integrated circuit device are used. Namely, an external resistor $R_5$ is connected in series with the voltage dividing resistor $R_4$ of the voltage dividing resistors $R_3$ and $R_4$. A division ratio of the node between the voltage dividing resistors $R_3$ and $R_4$ rises due to the external resistor $R_5$, resulting in $(R_4+R_5)/(R_3+R_4+R_5)$. Accordingly, if an overcurrent protection level is set to, for example, 10A without an external resistor $R_5$, the overcurrent protection level can be adjusted to, for example, 8A by a series connection of the external resistor $R_5$. As such, the overcurrent protection level can be adjusted to a smaller level by selecting a resistance voltage of the external resistor $R_5$. The amplified detection voltage from this amplifier 4 is applied to the voltage dividing resistors $R_3$ and $R_4$, and one end of the dividing resistor $R_4$ is connected to the current detection terminal ISD, and the external resistor $R_5$ is connected between the same and an external terminal Vss of a ground potential. The divided voltage can be adjusted by the external resistor $R_5$.

An overcurrent detection circuit 3 in the FIG. 12 embodiment is composed of a comparator, and receives a reference voltage ref input at one input terminal, and, at the other input terminal, a divided voltage input of a node between the voltage dividing resistors $R_3$ and $R_4$. An output of the comparator is applied to a control electrode of a MOS semiconductor element to output an overcurrent detection signal, and upon outputting the overcurrent detection signal, this MOS semiconductor element is turned ON to transmit a protection operation signal FAULT to the control circuit 1, while the same carries out a protection operation to stop supplying a control signal to control the inverter circuit to the driver circuit 2 for a fixed period of time.

In this method, a divided voltage of the node between the voltage dividing resistors $R_3$ and $R_4$ can be adjusted to a larger value by a function of the external resistor $R_5$, therefore, when a current which flows through the overcurrent detection resistor Rs becomes large, since the reference voltage is immediately exceeded at the overcurrent detection circuit 3, the overcurrent protection level can be adjusted to a smaller level. Accordingly, the overcurrent protection level set to, for example, 10A only with the voltage dividing resistors $R_1$ and $R_2$ can be lowered to, for example, 8A by an addition of the external resistor $R_5$.

A number of embodiments of the invention have been described. Nevertheless, it will be understood that various modifications may be made without departing from the spirit and scope of the invention. Accordingly, other embodiments are within the scope of the following claims.

What is claimed is:

1. A hybrid integrated circuit device with an overcurrent protection circuit, comprising:
    a plurality of switching elements,
    a drive circuit for driving the switching elements,
    a control circuit which generates a control signal to be inputted into the drive circuit to control a load,
    an overcurrent detection resistor connected to the switching elements,
    a detection voltage amplifier,
    voltage dividing resistors,
    an overcurrent detection circuit which compares a divided detection voltage with a reference voltage for carrying out an overcurrent protection,
    a hybrid integrated circuit comprising a plurality of connection pads, and
    a current detection terminal;
    wherein, in the vicinity of said current detection terminal, a first pad connected to receive a detection voltage from said overcurrent detection resistor, a second pad is connected to receive a detection voltage from said amplifier, and a third pad is connected to said voltage dividing resistors.

2. The device of claim 1 further comprising a bonding wire connection between said current detection terminal and one of said pads.

3. The hybrid integrated circuit device with an overcurrent protection circuit of claim 1, wherein
    when said current detection terminal is connected via a bonding wire to the pad connected to a detection voltage from said overcurrent detection resistor, for use with a separate overcurrent detection circuit outside the hybrid integrated circuit device.

4. The device of claim 3 in combination with an overcurrent detection circuit outside the hybrid integrated circuit device.

5. The hybrid integrated circuit device with an overcurrent protection circuit of claim 1, wherein
    when said current detection terminal is connected to the pad connected via a bonding wire to a detection voltage from said amplifier, for use with a separate overcurrent detection circuit provided outside the hybrid integrated circuit device.

6. The device of claim 5 in combination with an overcurrent detection circuit outside the hybrid integrated circuit device.

7. The hybrid integrated circuit device with an overcurrent protection circuit of claim 1, wherein, when said current detection terminal is connected via a bonding wire to said third pad,
    an amplifier for amplifying a detection voltage from said overcurrent detection resistor incorporated into said hybrid integrated circuit device, voltage dividing resistors for dividing said detection voltage, and an overcurrent detection circuit which compares a divided detection voltage with a reference voltage for carrying out an overcurrent protection are used, and
    an external resistor is connected to said current detection terminal and is connected in series with the voltage dividing resistors to change a division ratio so as to adjust an overcurrent protection level.

* * * * *